(12) United States Patent
Payne et al.

(10) Patent No.: US 10,399,427 B2
(45) Date of Patent: Sep. 3, 2019

(54) HYBRID MOTOR VEHICLE DRIVE TRAIN INCLUDING HYBRID MODULE BAFFLE BLADE

(71) Applicant: Schaeffler Technologies AG & Co. KG, Herzogenaurach (DE)

(72) Inventors: Matthew Payne, Glenmont, OH (US); Nicolas Wurst, North Canton, OH (US); John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 76 days.

(21) Appl. No.: 15/712,075

(22) Filed: Sep. 21, 2017

(65) Prior Publication Data

US 2019/0084402 A1    Mar. 21, 2019

(51) Int. Cl.
| | |
|---|---|
| *B60K 6/405* | (2007.10) |
| *B60K 6/46* | (2007.10) |
| *H02K 7/00* | (2006.01) |
| *H02K 7/108* | (2006.01) |
| *B60K 17/04* | (2006.01) |
| *B60W 30/00* | (2006.01) |
| *H02K 7/18* | (2006.01) |
| *H02K 5/00* | (2006.01) |

(52) U.S. Cl.
CPC ............... *B60K 6/405* (2013.01); *B60K 6/46* (2013.01); *B60K 17/04* (2013.01); *B60W 30/00* (2013.01); *H02K 5/00* (2013.01); *H02K 7/006* (2013.01); *H02K 7/18* (2013.01)

(58) Field of Classification Search
CPC .......... H02K 1/18; H02K 1/185; H02K 7/006; H02K 7/108; H02K 7/11; H02K 7/1815; B60K 6/26; B60K 6/405; F02N 11/04; F02N 15/00

USPC ........................................ 310/89, 91, 85, 112
See application file for complete search history.

(56) References Cited

U.S. PATENT DOCUMENTS

| | | | | | |
|---|---|---|---|---|---|
| 2,023,259 | A | * | 12/1935 | Anderson | H02K 1/185 310/402 |
| 2,493,414 | A | * | 1/1950 | Montford | H02K 1/185 164/106 |
| 4,881,001 | A | * | 11/1989 | Patel | H02K 1/185 310/216.052 |

(Continued)

FOREIGN PATENT DOCUMENTS

| | | |
|---|---|---|
| CN | 103158529 A | 6/2013 |
| JP | 2000 249214 A | 9/2000 |
| KR | 1020160047607 A | 5/2016 |

OTHER PUBLICATIONS

The International Search Report and Written Opinion issued in connection with International Application No. PCT/US2018/050790 dated Dec. 26, 2018.

*Primary Examiner* — Burton S Mullins
(74) *Attorney, Agent, or Firm* — Davidson, Davidson & Kappel, LLC

(57) ABSTRACT

A hybrid module is configured for arrangement in a torque path upstream from a transmission and downstream from an internal combustion engine. The hybrid module includes a drive unit including an electric motor and a housing, a torque converter connected to the electric motor and a baffle fixed to the housing and the stator. The baffle extends axially from the housing radially outside of the electric motor and the torque converter.

19 Claims, 3 Drawing Sheets

(56) References Cited

U.S. PATENT DOCUMENTS

| | | | | |
|---|---|---|---|---|
| 5,227,687 A * | 7/1993 | Baldwin | ................ | H02K 1/185 |
| | | | | 310/216.126 |
| 5,415,603 A * | 5/1995 | Tuzuki | ................... | B60K 6/26 |
| | | | | 477/138 |
| 5,558,591 A * | 9/1996 | Erickson | ............ | F16H 57/0447 |
| | | | | 184/6.12 |
| 6,150,747 A * | 11/2000 | Smith | ................... | H02K 1/185 |
| | | | | 310/156.28 |
| 6,455,976 B1 * | 9/2002 | Nakano | ................ | H02K 1/148 |
| | | | | 310/112 |
| 6,781,272 B2 * | 8/2004 | Kahlon | ................... | B60K 6/26 |
| | | | | 180/65.25 |
| 6,949,850 B2 * | 9/2005 | Dairi | ..................... | H02K 1/185 |
| | | | | 310/430 |
| 7,712,581 B2 * | 5/2010 | Billings | ............. | F16H 57/0489 |
| | | | | 184/13.1 |
| 8,097,997 B2 * | 1/2012 | Mizuno | ................ | B60K 6/365 |
| | | | | 310/216.131 |
| 8,258,670 B2 * | 9/2012 | Sakuma | ................ | H02K 1/185 |
| | | | | 310/216.118 |
| 9,212,736 B2 * | 12/2015 | Okuta | ................ | F16H 57/0457 |
| 9,327,590 B2 * | 5/2016 | Ideshio | ................... | B60K 6/44 |
| 9,878,706 B2 * | 1/2018 | Frait | ................... | B60W 10/02 |
| 2006/0060424 A1 * | 3/2006 | Tominaga | ........... | F16H 57/0423 |
| | | | | 184/11.1 |
| 2006/0179973 A1 * | 8/2006 | Matsufuji | ........... | F16H 57/0047 |
| | | | | 74/606 R |
| 2012/0175212 A1 | 7/2012 | Hart et al. | | |
| 2014/0241912 A1 * | 8/2014 | Braun | ................... | F04D 29/628 |
| | | | | 417/363 |
| 2016/0084363 A1 | 3/2016 | Steinberger et al. | | |

* cited by examiner

HYBRID MOTOR VEHICLE DRIVE TRAIN INCLUDING HYBRID MODULE BAFFLE BLADE

The present disclosure relates generally to hybrid motor vehicle drive trains and more specifically to altering the fluid flow in hybrid modules.

BACKGROUND

Some hybrid motor vehicle drive trains include a hybrid module including a torque converter running in a wet environment inside the bell housing. The torque converter can create a vortex of oil inside the bell housing, which has been linked to a drag loss on the order of 1 Nm.

SUMMARY OF THE INVENTION

A hybrid module configured for arrangement in a torque path upstream from a transmission and downstream from an internal combustion engine is provided. The hybrid module includes a drive unit including an electric motor and a housing, a torque converter connected to the electric motor and a baffle fixed to the housing and the stator. The baffle extends axially from the housing radially outside of the electric motor and the torque converter.

Embodiments of the hybrid module may include one or more of the following features:
  the baffle includes a blade portion and a connector extending axially inward from the blade portion to engage the stator;
  the connector is at least one hook;
  the stator includes an axial protrusion extending from a torque converter facing surface thereof, the at least one hook wrapping around the protrusion;
  the at least one hook is flexible and is deformed onto the protrusion;
  the blade portion is arced and extends circumferentially along the electric motor and the torque converter;
  circumferential ends of the blade portion each include circumferentially extending slots formed therein;
  the baffle includes a tab extending radially inward from the blade portion;
  the tab extends circumferentially in an arced path;
  the baffle includes a base connected to the housing, the baffle being cantilevered to the housing at the base;
  the base includes at least one base hole, the housing including at least one housing hole, the hybrid module further including at least one fastener, each fastener extending through a corresponding one of the base holes into a corresponding one of the housing holes.

A method of constructing a hybrid module configured for arrangement in a torque path upstream from a transmission and downstream from an internal combustion engine is also provided. The method includes providing a drive unit including an electric motor and a housing; connecting a torque converter to the electric motor; and fixing a baffle to the housing and to the stator such that the baffle extends axially from the housing radially outside of the electric motor and the torque converter.

Embodiments of the method may include one or more of the following features:
  the fixing of the baffle to the stator includes engaging the stator with a connector extending axially inward from a blade portion of the baffle;
  the connector is at least one hook and the stator includes an axial protrusion extending from a torque converter facing surface thereof, the engaging of the stator including deforming the hook onto the protrusion;
  a base of the baffle includes at least one base hole, the housing including at least one housing hole, the deforming of the hook including inserting at least one fastener through a corresponding one of the base holes into a corresponding one of the housing holes and tightening the at least one fastener, the tightening of the at least one fastener deforming the hook;
  the blade portion is arced and extends circumferentially along the electric motor and the torque converter;
  circumferential ends of the blade portion each include circumferentially extending slots formed therein;
  the baffle includes a tab extending radially inward from the blade portion.

BRIEF DESCRIPTION OF THE DRAWINGS

The present invention is described below by reference to the following drawings, in which.

DETAILED DESCRIPTION

The present disclosure provides a baffle for a hybrid module having at least one flexible hook which clamps the baffle between the electric motor stator rim, which provides a first mounting point, and the front module housing, which provides a second mounting point.

Figure 1:
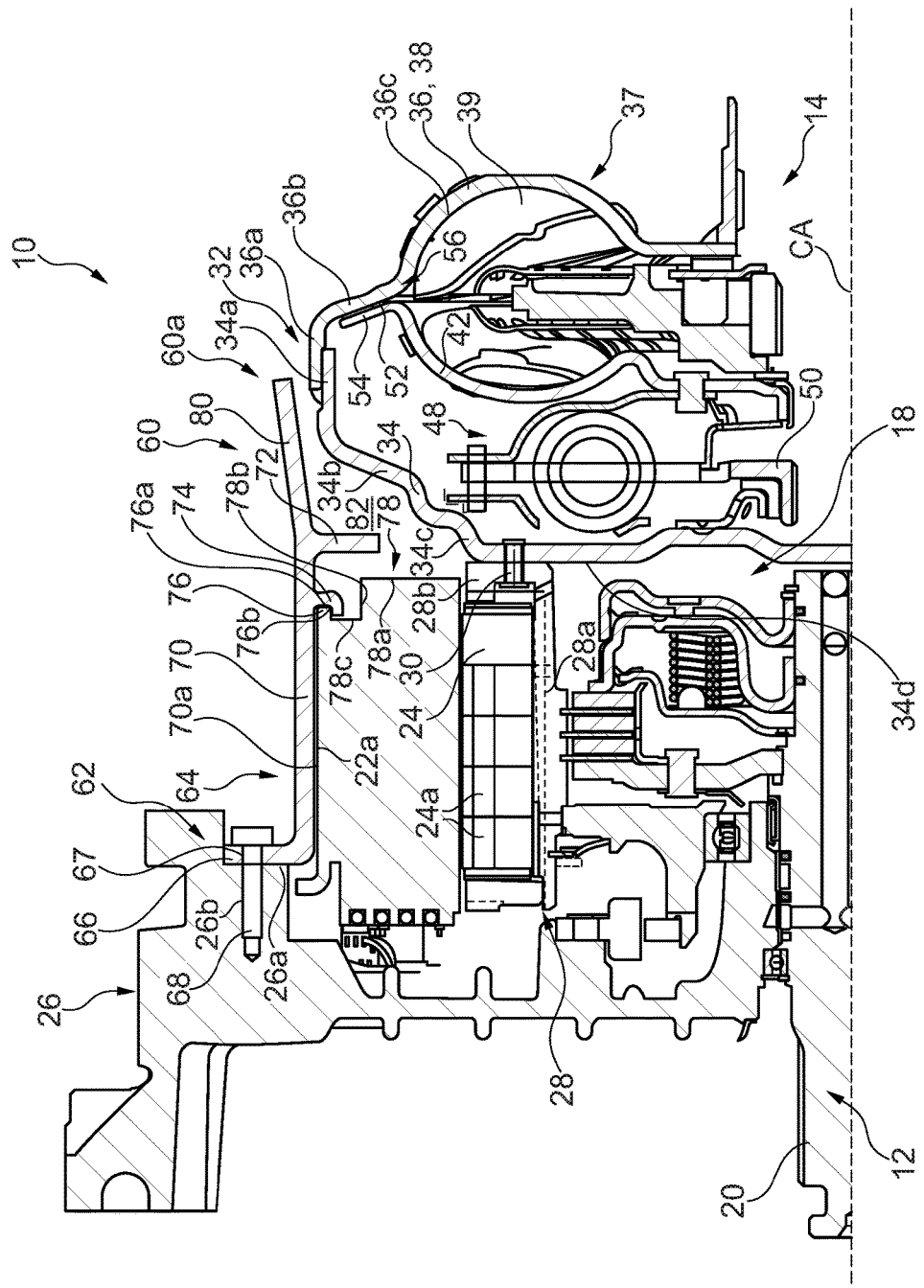
FIG. 1 shows a hybrid module in accordance with an embodiment of the present invention.

FIG. 1 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier 28. Rotor carrier 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier 28 by a plurality of fasteners 30 passing through a cover 32 of torque converter 14.

Torque converter 14 includes a front cover 34 and a rear cover 36 together forming cover 32, with fasteners 30 passing through front cover 34. Front cover 34 includes an axially extending portion 34a defining an outermost circumferential surface of front cover 34. Extending radially inward from portion 34a and axially toward drive unit 12, front cover 34 also includes a frustoconical section 34b, which at a radially inner end thereof joins an intermediate axially extending portion 34c. Extending radially inward from portion 34c to center axis CA, front cover 34 further includes a radially extending central portion 34d, which fasteners 30 pass axially therethrough.

Rear cover 36 includes forms an impeller shell 38 of an impeller 37 that includes a plurality of impeller blades 39. Rear cover 36 includes an axially extending portion 36a defining an outermost circumferential surface of rear cover 36. Axially extending portion 36a axially overlaps axially extending portion 34a, with axially extending portion 36a being radially outside of axially extending portion 34a such that an inner circumferential surface of axially extending portion 36a contacts an outer circumferential surface of axially extending portion 34a and portions 34a, 36a are welded together. Extending radially inward from portion 36a and axially away drive unit 12, rear cover 36 also includes a frustoconical section 36b, which at a radially inner end thereof joins an a rounded blade supporting portion 36c, which is shaped as an annular bowl, contacting impeller blades 39.

Torque converter 14 also includes a turbine 40 configured to define a piston that is axially moveable toward and away from impeller shell 38 such that an engagement section of turbine 40 engages an engagement section of impeller shell 38 so as to form a lockup clutch. Turbine 40 includes a turbine shell 42 supporting a plurality of turbine blades 44. Torque converter 14 also includes a stator 46 axially between turbine 40 and impeller 37 to redirect fluid flowing from the turbine blades 44 before the fluid reaches impeller blades 39 to increase the efficiency of torque converter 14. Torque converter 14 further includes a damper assembly 48 fixed to turbine shell 42. Damper assembly 48 is configured for receiving torque from turbine shell 42 and transferring torque to the transmission input shaft. For transferring torque to the transmission input shaft, damper assembly 48 includes a support hub 50, which includes a splined inner circumferential surface for non-rotatably connecting to an outer circumferential surface of the transmission input shaft.

A friction material 52 is bonded onto a radially extending impeller facing surface of an outer radial extension 54 of turbine shell 42, which is radially outside of blades 44 and forms the engagement section of turbine 40, for engaging a radially extending wall 56 of impeller shell 38, which is radially outside of blades 39 and forms the engagement section of impeller shell 38. In other embodiments, instead of or in addition to being bonded to outer radial extension 54, friction material 52 may be bonded to radially extending turbine facing surface of radially extending wall 56, which is formed by frustoconical section 36b, or to one or more additional discs between radially extension 54 and wall 56. Regardless of whether friction material 52 is bonded to outer radial extension 54, radially extending wall 56 or one or more additional discs, friction material 52 is provided axially between extension 54 and wall 56 to selectively rotationally engage the engagement section of turbine piston 40 with the engagement section of impeller shell 38. Torque converter 14 receives torque input from hybrid drive unit 12 through fasteners 30 at front cover 34, which is transmitted to impeller 37. Impeller 37 drives turbine 40 via fluid flow from impeller blades 39 to turbine blades 44, when the lockup clutch is disengaged, or via friction material 52, when the lockup clutch is engaged. Turbine 40 then drives damper assembly 48, which in turn drives the transmission input shaft.

Figure 2:
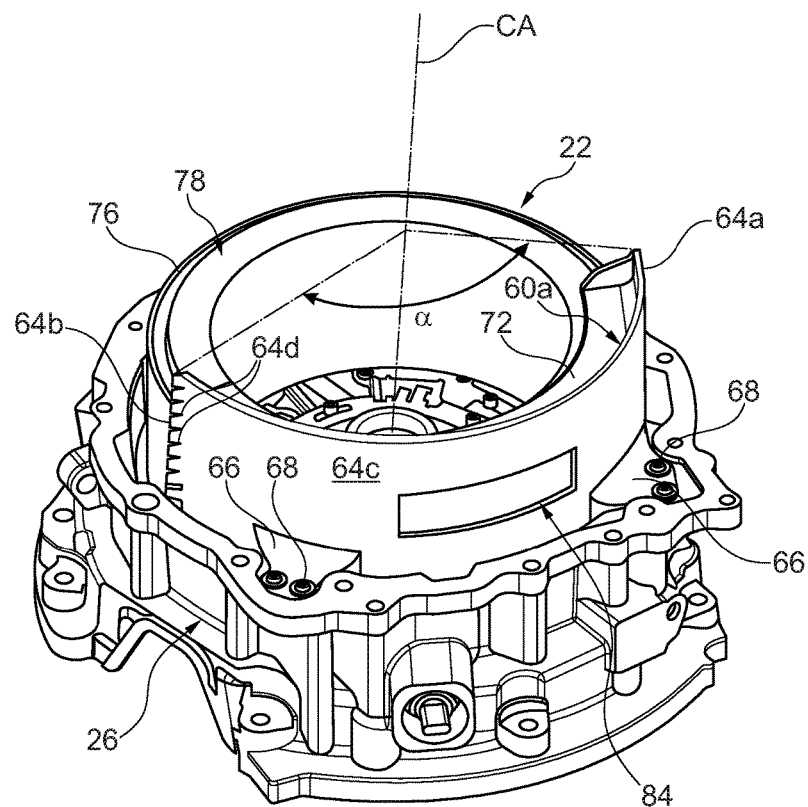
FIG. 2 shows a perspective view of a baffle, a stator and a housing of the hybrid module shown in FIG. 1.
Figure 3:
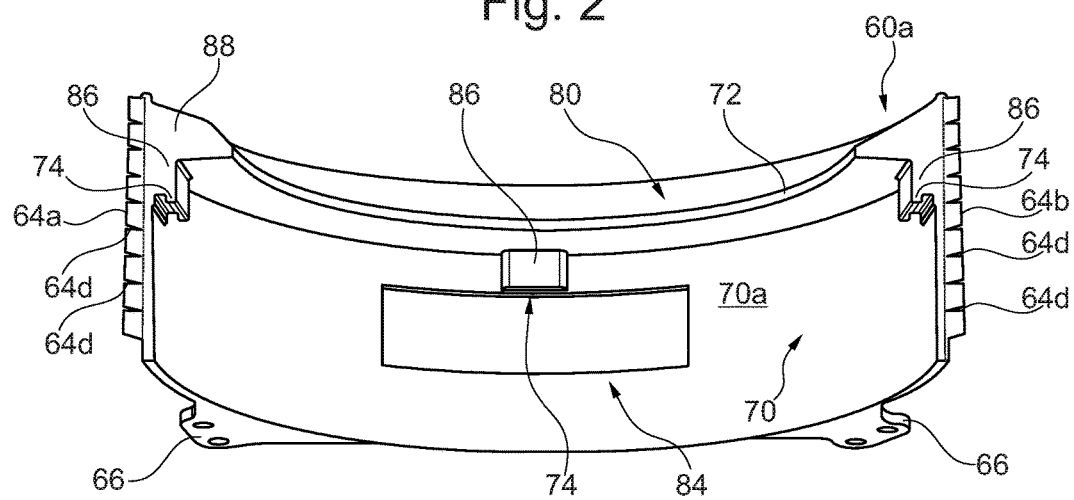
FIG. 3 shows a stand-alone perspective view of the baffle of the hybrid module shown in FIG. 1.

Hybrid module 10 further includes a baffle 60 fixed to housing 26 and stator 22 extending axially from housing 26 along a length of electric motor 16 onto torque converter 14. Baffle 60 is fixed cantileveredly to housing 26 and includes a base 62, which is fixed to housing 26, and an arced blade portion 64 (arc shape is illustrated in FIGS. 2 and 3), which extends circumferentially in an arced path and extends axially from base 62. Base 62 includes at least one flange 66 that protrudes radially outward from blade portion 64 and includes at least one hole 67 passing axially therethrough for at least one fastener 68 to pass through. Housing 26 includes a radially extending surface 26a axially abutting flange 66, with housing also being provided with a hole 26b passing axially into housing 26 through radially extending surface 26a for receiving fastener 68. Hole 26b may include threads for engaging threads of fastener 68 such that fastener 68 is engaged with housing 26 to hold baffle blade 60 in place on housing 26.

Blade portion 64 includes a first portion 70 extending axially from base 62 to a radially inwardly protruding tab 72, which also extends circumferentially in an arced path (arc shape is illustrated in FIGS. 2 and 3). First portion 70 extends along an outer circumferential surface 22a of stator 22 and is provided with a connector in the form of flexible hook 74 protruding radially inward from an inner circumferential surface 70a thereof. In the embodiment shown in FIG. 1, inner circumferential surface 70a does not contact outer circumferential surface 22a. Hook 74 engages a protrusion 76 protruding axially from a torque converter facing surface 76 of stator 22. Torque converter facing surface 78 has a stepped configuration that includes three surface portions 78a, 78b, 78c. An inner radially extending surface portion 78a includes a radially outer end that joins an axially extending surface portion 78b. Axially extending surface portion 78b extends from surface portion 78a away from torque converter 14 to join an outer radially extending surface portion 78c. Protrusion 76 protrudes axially from surface portion 78a. Hook 74 wraps around a torque converter facing edge 76a of protrusion 76 and extends axially away from torque converter 14 to contact a radially inner surface 76b of protrusion 76, fixing hook 74 radially in place on stator 22 such that fluid flow does not force first portion 70 to separate from stator 22. The engagement of protrusion 76 by hook 74 provides further stability for baffle 60, providing a support for baffle 60 between base 62 and a free end 60a of baffle 60.

Blade portion 64 includes a second portion 80 extending axially from tab 72 to free end 60a. Second portion 80 is tapered axially outward with respect to first portion 70 and extends radially outside of front cover 34. Free end 60a is aligned directly radially outside of where axially extending portions 34a, 36a of front cover 34 and rear cover 36 overlap. Tab 72 protrudes radially inward with respect to portions 70, 80 into a space 82 formed axially between front cover 34 and stator 22. More specifically, space 82 is defined axially between frustoconical section 34b and torque converter facing surface 78 of stator 22. Accordingly, baffle 60 is configured for redirecting fluid flow radially outside of drive unit 16 and torque converter 14 back to the sump of the transmission.

FIG. 2 shows a perspective view of baffle 60, stator 22 and housing 26 of hybrid module 10 shown in FIG. 1 and FIG. 3 shows a stand-alone perspective view of baffle 60. Arced blade portion 64 of baffle 60 extends circumferentially in an arced path between a first axially extending circumferential edge 64a and a second circumferential edge 64b, with edges 64a, 64b being spaced from each other by an angle α of between 120 and 180 degrees with respect to center axis CA. In other words, blade portion 64 extends by angle α with respect to center axis. In the embodiment shown in FIG. 2, angle α is 135 degrees. Blade portion 64 includes an outer circumferential surface 64c extending from edge 64a to edge 64b. Blade portion 64 tapers radially outward at edges 64a, 64b and each edge 64a, 64b includes a plurality of axially spaced circumferentially extending slots 64d extending from edge 64a into blade portion 64 that define tabs 64e, which are thinner than a remainder of second portion 80 and come to a point at edges 64a, 64b. Midway between edges 64a, 64b, first portion 70 of blade portion 64 is provided with a slot 84, which forms an oil outlet that allows oil to exit radially outward from the space between stator and baffle 60, extending through blade portion 64 from outer circumferential surface 64c to inner circumferential surface 70a.

In the embodiment shown in FIG. 2, two flanges 66, which are circumferentially spaced from each other, extend radially outward from outer circumferential surface 64c. Two fasteners 68 each through each flange 66 into housing 26. Also, as illustrated in FIG. 3, baffle 60 includes three hooks 74, one at each of the circumferential ends of baffle 60 and one in the circumferential center of baffle 60 aligned with a circumferential center of slot 84. Hooks 74 are designed for installation on protrusion 76, which in the embodiment in FIG. 2 is formed as an annular rim protruding axially from surface 78. In FIG. 3, hooks 74 are each connected to tab 72 by a respective web 86. At one circumferential end of baffle 60, a wall 88 is provided connecting tab 72 to the circumferential end of second portion 80.

Figure 4A:
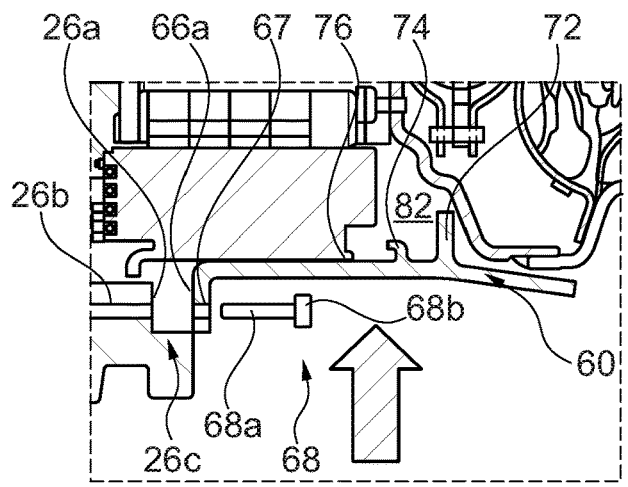
FIGS. 4a to 4c illustrate the installation of the baffle onto the stator and the housing in accordance with an embodiment of the invention.
Figure 4B:
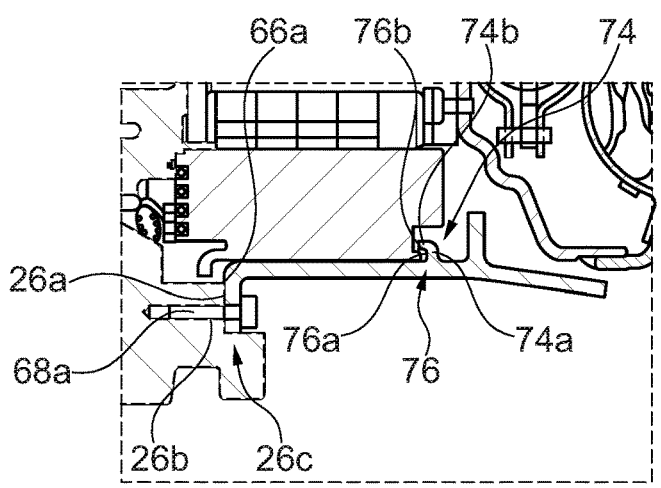
Figure 4C:
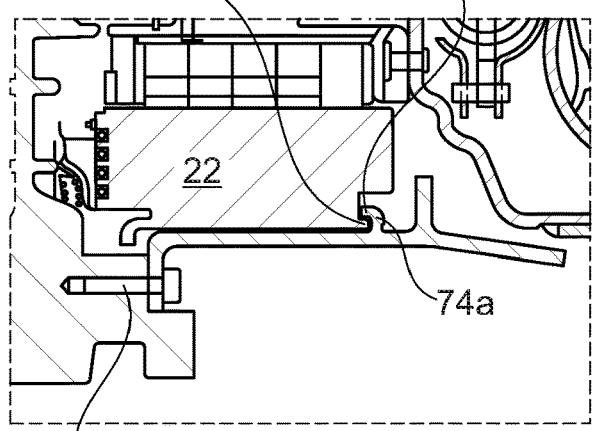

FIGS. 4a to 4c illustrate the installation of baffle 60 onto stator 22 and housing 26. FIG. 4a shows baffle 60 being inserted radially onto stator 22. Tab 72 is inserted radially into space 82 and inner circumferential surface 70a of first portion 70 contacts outer circumferential surface 22a of stator 22. Hooks 74 are also provided in space 82 and hooks 74 are axially aligned with protrusion 76. Flange 66 is aligned with a slot 26c formed in housing 26 such that an end face of base 62, which is formed by a radially extending surface 66a of flange 66, faces radially extending surface 26a of housing 26. Hole 67 in flange 66 is aligned with hole 26b in housing 26 and fastener 68 has not yet been inserted into holes 67, 26b. Fastener 68 includes a threaded shaft 68a and a head 68b.

Next, as shown in FIG. 4b, baffle 60 is moved axially toward housing 26 such that base 62 of baffle 60 is received inside of slot 26c and radially extending surface 66a of flange 66 contacts radially extending surface 26a of housing 26. As base 62 contacts housing 26, hooks 74 come into alignment with protrusion 76. Fasteners 68 are then inserted through holes 67 and into holes 26b and rotated such that threads of shaft 68a engage threads of holes 26b. As shown in FIG. 4b, hooks 74 each include a radially extending section 74a extending radially inward from first portion 70 and an axially extending section 74b protruding axially from section 74a. In FIG. 4b, fasteners 68 are tightened to a degree that axially extending section 74b of each of hooks 74 contacts radially inner surface 76b of protrusion 76, but radially extending section 74a of each of hooks 74 do not yet contact torque converter facing edge 76a of protrusion 76.

Next, as shown in FIG. 4c, fasteners 68 are tightened to a specified torque that deforms hooks 74, thereby clamping baffle 60 into place on housing 26 and stator 22. Fasteners 68 are tightened axially into housing 26 such that torque converter facing edge 76a of protrusion 76 contacts radially extending section 74a of each of hooks 74, thereby deforming hooks 74. Hooks 74 thus provide further support to hold baffle 60 axially and radially in place on stator 22.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 input shaft
22 stator
22a outer circumferential surface
24 rotor
24a magnet segments
26 housing
26a radially extending surface
26b threaded hole
26c slot
28 rotor carrier
28a cylindrical axially extending section
28b radially extending section
30 fasteners
32 cover
34 front cover
34a axially extending portion
34b frustoconical section
34c intermediate axially extending portion
34d radially extending central portion
36 rear cover
36a axially extending portion
36b frustoconical section
36c rounded blade supporting portion
37 impeller
38 impeller shell
39 impeller blades
40 turbine
42 turbine shell
44 turbine blades
46 stator
48 damper assembly
50 support hub
52 friction material
54 outer radial extension
56 radially extending wall
60 baffle
60a free end
62 base
64 arced blade portion 64a first axially extending circumferential edge
64b second axially extending circumferential edge
64c outer circumferential surface
64d axially spaced circumferentially extending slots
64e tabs
66 flange
66a radially extending surface
67 hole
68 fastener
68a threaded shaft
68b head
70 first portion
70a inner circumferential surface
72 radially inwardly protruding tab
74 connector—flexible hook
74a radially extending section
74b axially extending section
76 protrusion
76a torque converter facing edge
76b radially inner surface
78 torque converter facing surface
78a inner radially extending surface portion
78b axially extending surface portion
78c outer radially extending surface portion
80 second portion
82 space
84 slot
86 web
88 wall

What is claimed is:

1. A hybrid module configured for arrangement in a torque path upstream from a transmission and downstream from an internal combustion engine, the hybrid module comprising:
a drive unit including an electric motor and a housing, the electric motor including a stator and a rotor rotatable inside of the stator;
a torque converter connected to the electric motor; and
a baffle fixed to the housing and the stator, the baffle extending axially from the housing radially outside of the electric motor and the torque converter, a blade portion of the baffle being arced and extending circumferentially along the electric motor and the torque converter from a first circumferential end of the blade portion to a second circumferential end of the blade portion, the first and second circumferential ends being circumferentially spaced from each other.

2. The hybrid module as recited in claim 1 wherein the baffle includes a connector extending radially inward from the blade portion to engage the stator.

3. The hybrid module as recited in claim 2 wherein the connector is at least one hook.

4. The hybrid module as recited in claim 3 the stator includes an axial protrusion extending from a torque converter facing surface thereof, the at least one hook wrapping around the protrusion.

5. The hybrid module as recited in the claim 3 wherein the at least one hook is flexible and is deformed onto the protrusion.

6. The hybrid module as recited in claim 2 wherein the first and second circumferential ends of the blade portion each include circumferentially extending slots formed therein.

7. The hybrid module as recited in claim 2 wherein the baffle includes a tab extending radially inward from the blade portion.

8. The hybrid module as recited in claim 7 wherein the tab extends circumferentially in an arced path.

9. The hybrid module as recited in claim 1 wherein the baffle includes a base connected to the housing, the baffle being cantilevered to the housing at the base.

10. The hybrid module as recited in claim 9 wherein the base includes at least one base hole, the housing including at least one housing hole, the hybrid module further including at least one fastener, each fastener extending through a corresponding one of the base holes into a corresponding one of the housing holes.

11. The hybrid module as recited in claim 1 wherein the first and second circumferential ends are spaced from each other by an angle of between 120 and 180 degrees with respect to a center axis of the hybrid module.

12. A method of constructing a hybrid module configured for arrangement in a torque path upstream from a transmission and downstream from an internal combustion engine, the method comprising:
providing a drive unit including an electric motor and a housing, the electric motor including a stator and a rotor rotatable inside of the stator;
connecting a torque converter to the electric motor; and
fixing a baffle to the housing and to the stator such that the baffle extends axially from the housing radially outside of the electric motor and the torque converter, the baffle including a base and a free end, the fixing of the baffle to the housing including fixing the base to the housing such that the base is aligned radially outward from the stator and the free end is aligned radially outward from the torque converter, the baffle being cantilevered to the housing at the base and extending axially away from the base and the housing to the free end.

13. The method as recited in claim 12 wherein the fixing of the baffle to the stator includes engaging the stator with a connector extending radially inward from a blade portion of the baffle.

14. The method as recited in claim 13 wherein the connector is at least one hook and the stator includes an axial protrusion extending from a torque converter facing surface thereof, the engaging of the stator including deforming the hook onto the protrusion.

15. The method as recited in claim 14 wherein the base of the baffle includes at least one base hole, the housing including at least one housing hole, the deforming of the hook including inserting at least one fastener through a corresponding one of the base holes into a corresponding one of the housing holes and tightening the at least one fastener, the tightening of the at least one fastener deforming the hook.

16. The method as recited in claim 13 wherein the blade portion is arced and extends circumferentially along the electric motor and the torque converter.

17. The method as recited in claim 13 wherein circumferential ends of the blade portion each include circumferentially extending slots formed therein.

18. The method as recited in claim 13 wherein the baffle includes a tab extending radially inward from the blade portion.

19. A hybrid module configured for arrangement in a torque path upstream from a transmission and downstream from an internal combustion engine, the hybrid module comprising:
a drive unit including an electric motor and a housing, the electric motor including a stator and a rotor rotatable inside of the stator;
a torque converter connected to the electric motor; and
a baffle fixed to the housing and the stator, the baffle extending axially from the housing radially outside of the electric motor and the torque converter, the baffle including a blade portion and a tab extending radially inward from the blade portion, the tab being in a space axially delimited by the stator and a front cover of the torque converter.

\* \* \* \* \*